United States Patent

[11] 3,632,140

[72] Inventors Thomas O. Paine
Administrator of the National Aeronautics and Space Administration with respect to an invention of;
Donald J. Starkey, Pasadena; Kenneth C. Curry, La Canada, both of Calif.
[21] Appl. No. 59,895
[22] Filed July 31, 1970
[45] Patented Jan. 4, 1972

[54] TORSIONAL DISCONNECT UNIT
4 Claims, 2 Drawing Figs.
[52] U.S. Cl. ................................................ 285/18,
285/345, 138/178
[51] Int. Cl. ................................................ F16l 35/00
[50] Field of Search ................................................ 287/126;
285/1, 18, 231, 177, 345, 298; 138/103, 178;
137/799; 279/1 B, 1 T; 73/99, 161; 64/28, 30;
195/55, 56

[56] References Cited
UNITED STATES PATENTS
| | | | |
|---|---|---|---|
| 1,126,780 | 2/1915 | Jones | 192/56 |
| 1,730,022 | 10/1929 | VonArx | 285/177 X |
| 2,449,555 | 9/1948 | Hopkins et al. | 192/56 C |
| 2,558,695 | 6/1951 | Unger | 285/231 X |
| 2,626,029 | 1/1953 | Gutterman | 192/56 C |
| 2,905,194 | 9/1959 | Smith et al. | 138/178 X |
| 3,211,473 | 10/1965 | Schmid | 285/298 X |
| 3,327,825 | 6/1967 | Fann | 192/12 B X |
| 3,402,743 | 9/1968 | Brueder | 138/178 |

*Primary Examiner*—David J. Williamowsky
*Assistant Examiner*—Wayne L. Shedd
*Attorneys*—J. H. Warden, Paul F. McCaul and John R. Manning

ABSTRACT: A torsional disconnect unit particularly suited for use in releasably coupling distal ends of mutually displaceable, coaxially related portions of a fluid conduit, characterized by a substantially rigid tube, wound to a configuration conforming to a uniform helix and having an end thereof fixedly secured to one rotatably supported coupling component, of a pair of concentrically mated coupling components, while its opposite end rigidly is fixed against rotation. A particular feature of the invention resides in utilizing those characteristics of a helix which cause a helix to unwind, as it is elongated, in developing torque of a magnitude sufficient to overcome static friction as a mutual rotation between the components is initiated, whereby an axial separation of the components is attainable employing an axially directed force of magnitude sufficient to overcome sliding friction.

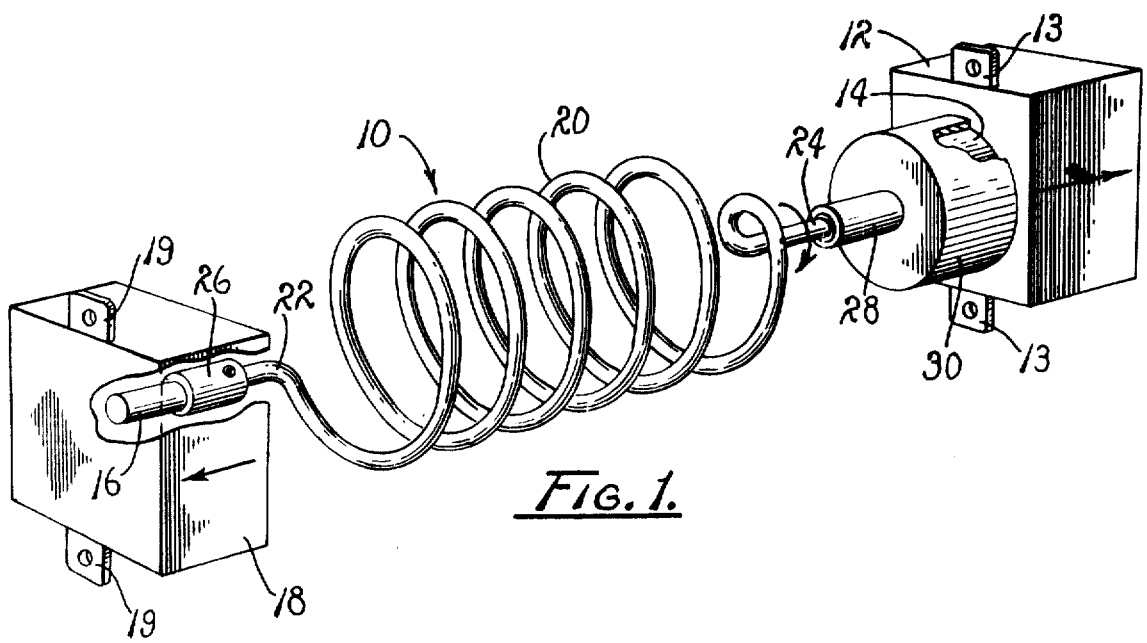
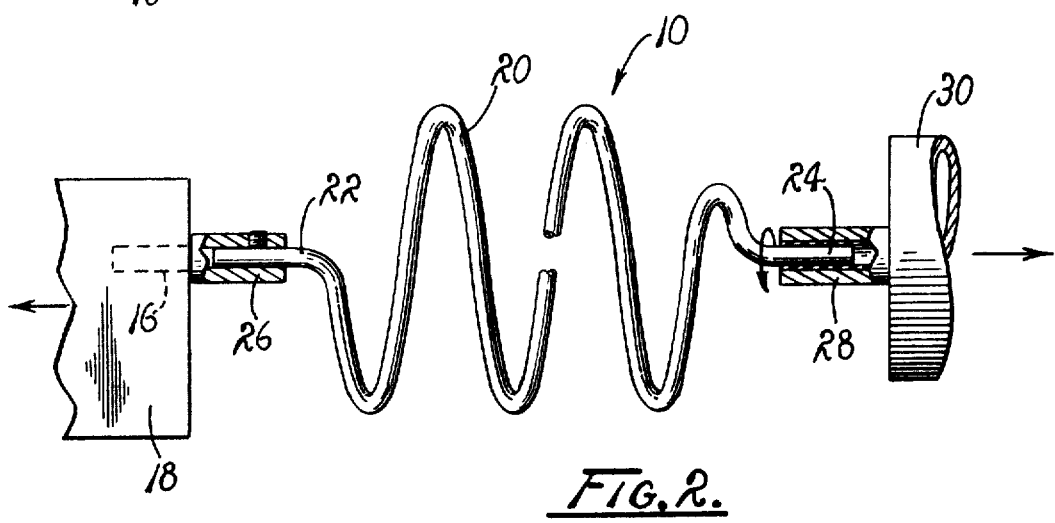
DONALD J. STARKEY
KENNETH C. CURRY
INVENTORS
ATTORNEYS 3,632,140

TORSIONAL DISCONNECT UNIT

ORIGIN OF INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2,457').

BACKGROUND OF THE INVENTION

1. Field of the Invention

The invention relates to disconnect units, and more particularly to a torsional disconnect unit which is adapted to apply to a coupling component, of an associated pair of concentrically related components, torque of a magnitude sufficient for overcoming static friction while simultaneously applying an axially directed force of a magnitude sufficient for overcoming sliding friction to achieve axial separation of the components.

2. Description of the Prior Art

The prior art is replete with disconnect units employable in axially separating coupling components of various types. Normally, where axial motion is converted to rotary motion for purposes of applying torque to coupling components, disconnect units include complex mechanical linkages of various types. Such structure often becomes quite complicated, bulky and of a significant mass. Where coupling component is coupled within a system which accommodates a flow of fluid under pressure, difficulty often is encountered in accommodating a torquing of the component, due to the fact that it frequently is necessary to maintain a fluid seal between a multiplicity of moving parts. Where separation of coupling components is achieved utilizing only axially directed forces, applied to the couplings, for effecting an axial separation thereof, static friction initially must be overcome by the axially directed forces. When employing such structure, excessive shock frequently is encountered, particularly where the coupling being separated are interconnected within a system including delicate instrumentation or similar structural components.

Therefore, there currently exists a need for a practical simplified and highly reliable disconnect unit which can be employed in coupling fluid conduits in a manner such that associated coupling components readily are separable separable employing axially directed forces of minimal magnitude and applied in a manner such that effects of shock-inducing forces are minimized.

OBJECTS AND SUMMARY OF THE INVENTION

Therefore, it is an object of the instant invention to provide an improved disconnect unit for use in separating axially related coupling components.

Another object is to provide a torsional disconnect unit adapted to interconnect related portions of a fluid-flow system.

Another object is to provide an improved disconnect unit, the configuration of which conforms to a uniform helix so as to impart torque to an associated, rotatable coupling component as tension is applied thereto, whereby developed static friction is overcome by angularly applied forces, while component separation is achieved employing an axially applied force of a magnitude sufficient to overcome sliding friction.

Another object of the instant invention is to provide an improved disconnect unit including therein a tubular conduit conforming to a uniform helix circumscribing an axis of symmetry and connecting adjacent end portions of fluid conduits.

Another object is to provide a disconnect unit operatively coupled between adjacent, coaxially related conduits adapted to effect axial separation of concentrically related coupling components as an axially directed, separating force, of a magnitude sufficient for overcoming sliding friction established between the components, is applied to the components.

It is another object of the instant invention to provide a disconnect unit including therein a unique arrangement of uniquely related components.

These and other objects and advantages are achieved through a unique arrangement of a semirigid conduit, configured to conform to an elongated uniform helix circumscribing an axis of symmetry, coupled to an associated torque-actuated coupling component concentrically related to a fixed nipple and adapted to be rotated about an axis coincident with the axis of symmetry of the helix. Hence, the inherent characteristics of a helix readily are employable in imparting torque to the associated coupling component, as tension is applied to the conduit, whereby static friction developed between the component and nipple is overcome by applied torque and an axial separation of the component and nipple is achieved as sliding friction developed therebetween is overcome through an application of an axially directed separating force.

BRIEF DESCRIPTION OF THE DRAWING

FIG. 1 is a perspective view of an operatively assembled torsional disconnect unit which embodies the principles of the instant invention.

FIG. 2 is a partially sectioned, fragmentary view of the actuator shown in FIG. 1.

DESCRIPTION OF THE PREFERRED EMBODIMENT

Referring now to the drawing wherein like reference characters designate like or corresponding parts throughout the several views, there is shown in FIG. 1 a torsional disconnect unit 10 embodying the principles of the present invention.

While the torsional disconnect unit 10 is of general utility, it has particular utility in coupling purge lines, not shown, coupled with instrumentation located aboard spacecraft and the like, whereby a separation of instrumentation and associated purge lines is effected as a separation of the spacecraft from its protective shroud is achieved as the craft enters outer space.

As illustrated, the unit 10 is disposed between an instrument block 12, having affixed thereto mounting brackets 13 and including a tubular nipple 14. As illustrated, this nipple is extended in a substantially coaxial relationship with a mutually spaced nipple 16 operatively supported within a suitable mounting block 18. As a practical matter, the mounting block 18 is coupled, through suitable mounting brackets 19, including a shroud not shown, while the instrument block 12 includes instrumentations adapted to be displaced relative to the shroud for imparting thereto mutual displacement between the nipples 14 and 16. It is to be understood that the blocks 12 and 18 are restrained against rotation by their respective mounting brackets.

As illustrated, the unit 10 further includes a tubular conduit 20 which is wound into a configuration conforming to a uniform helix having an elongated axis of symmetry. Preferably, the conduit 20 is fabricated from a suitable semirigid material, including synthetic resins, thin gauge metals and the like. The helically configured conduit 20 terminates in coaxially related end portions including a first end portion 22, concentrically related to the axis of symmetry of the helix, and a second end portion 24, which also concentrically is related to this axis of symmetry.

In practice, the end portion 22 securely is coupled to the nipple 16 through a suitable sleeve 26, which telescopingly receives, in coaxial relationship, the distal end portions of both the nipple 16 and the portion 22 of the conduit 20. It is, of course, to be understood that a particular manner in which the sleeve 26 is united with the nipple 16 and the portion 22 of the conduit 20 is a matter of convenience and can be varied as found practical. However, screw threads, pins, silver-solder and the like have been satisfactorily employed in coupling the sleeve 2 with the conduit 20 and nipple 16. In any event, it is to be understood that the end portion 22 is secured against rotation relative to the axis of symmetry of the helical conduit.

The opposite end portion 24, of the conduit 20, is received within a tubular sleeve 28. This sleeve rigidly is fixed to a coaxially related coupling component 30. As illustrated, the component 30 conforms to a caplike fitting and then concentrically receives, in a mated relationship, the extended nipple 14. Of course, the distal end portion 24 of the conduit 20 is united with the sleeve 28 in any manner found suitable. If desired, structure similar to that employed in coupling the sleeve 26 with the distal end portion 22 can successfully be utilized. The sleeve 28 and the component 30 also are united in a similar manner. However, where preferred, the component 30 and the sleeve 28 can be stamped or otherwise fabricated as integral structure.

In order to secure the component 30, in its mated relationship with the nipple 14, friction frequently is employed, although screw threads and the like can be employed. While not shown, it is to be understood that the component 30 includes suitable O-rings and the like appropriately seated for establishing an hermetic seal between the internal surface of the component 30 and the external surface of the nipple 14. It will be appreciated that regardless of the means employed in coupling the component 30 and nipple 14, a friction fit necessarily is established between adjacent mated surfaces of the nipple 14 and the component as they are coupled in an hermetically sealed, operative relationship. Once the component 30 and nipple 14 are mated a flow of pressurized fluid can operatively be established from the instrument block 12 to a selected fluid flow system operatively coupled therewith through the conduit 20 and the nipple 16.

As is well recognized, the spring characteristics of a helix tend to impart an unwinding deformation of a helix as axial forces are oppositely applied to the ends thereof for thereby placing the helix under tension. Consequently, but uniting the component 30 with the end portion 24 of the conduit 20, mutually lateral displacement established between the blocks 12 and 18 serves to develop tension in the conduit 20 whereby resulting forces angularly are applied to the component 30, through a moment arm dictated by the diameter of the helix.

In practice, the torque thus developed and applied to the component 30 is of a magnitude sufficient for overcoming static friction as it is developed between the adjacent surfaces of the nipple 14 and component 30. As the tension developed within the conduit 20 is increased, an axially directed force component simultaneously is applied to the component 30. Consequently, the component 30 simultaneously is subjected to both angularly and axially related force components. The component 30 and the nipple 14 are separated by the axially applied force component as its magnitude operatively is increased sufficiently for overcoming sliding friction. Hence, the axially directed force component required in overcoming sliding friction is of a magnitude much smaller than is required to overcome the developed static friction as the component 30 and the nipple 14 are separated.

In view of the foregoing, it should readily be apparent that the present invention is embodied in a simplified disconnect unit which has particular utility in coupling adjacent end portions of fluid conduits in a manner such that there separation is achieved employing minimal axially directed force components. However, it is to be understood that while the disconnect unit 10 has particular utility within a system employing fluid conduits, the unit can be employed equally as well in any operable environment wherein oppositely directed forces are available, for developing and applying torque to selected structural components.

Although the invention has been herein shown and described in what is conceived to be the most practical and preferred embodiment, it is recognized that departures may be made therefrom within the scope of the invention, which is not to be limited to the illustrative details disclosed.

What is claimed is:

1. A torsional disconnect unit comprising:
   a. an elongated having a configuration conforming to a uniform helix concentrically related to an axis of symmetry;
   b. a torque-actuatable, coupling component rigidly coupled to a first end of the member adapted to be rotated about said axis of symmetry;
   c. a support means rigidly coupled to a second end of the member adapted to be displaced relative to said coupling along a path parallel to said axis of symmetry for developing tension in said member, whereby the member responsively is deformed about the axis of symmetry for applying torque to said coupling; and
   d. means for inhibiting rotation of said support means about said axis of symmetry.

2. The unit of claim 1 wherein said member comprises tubular conduit communicating with said coupling and adapted to accommodate a passage of fluid therebetween.

3. The unit of claim 2 wherein said coupling concentrically is seated on a nipple operatively associated with a body of fluid.

4. The unit of claim 3 wherein said support means is coupled to a second nipple operatively associated with a fluid conduit.

* * * * *